UNITED STATES PATENT OFFICE.

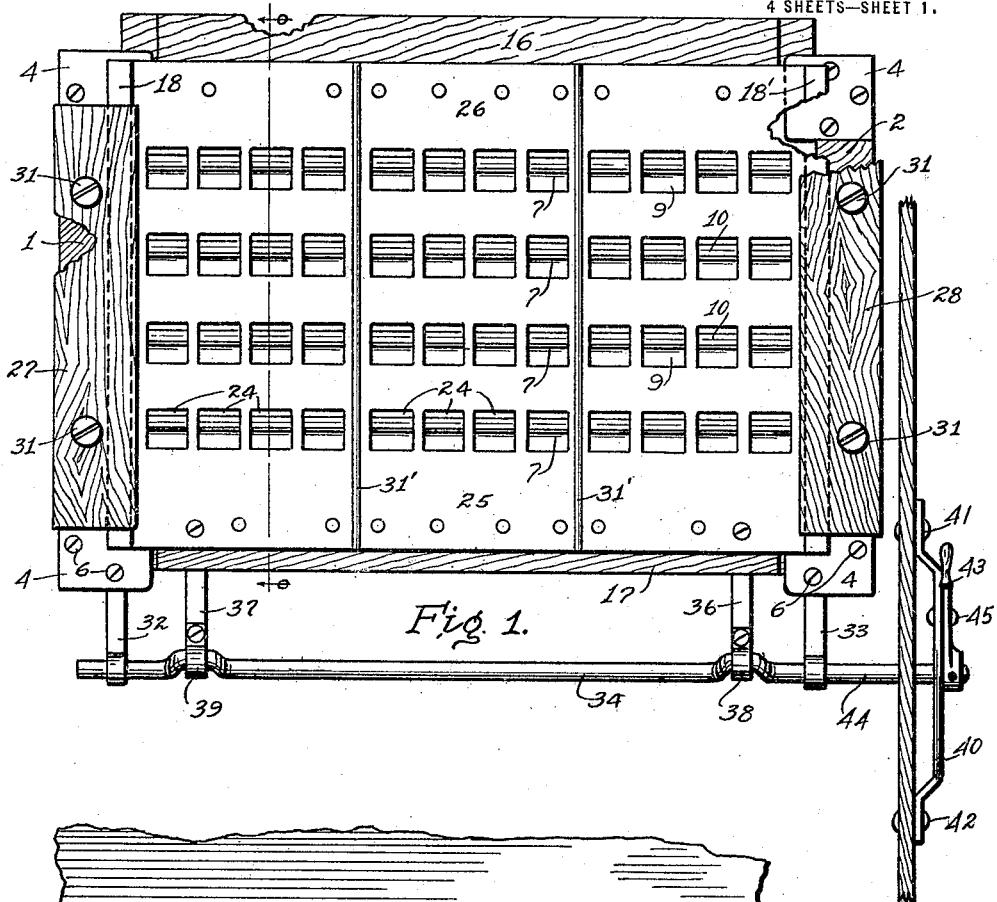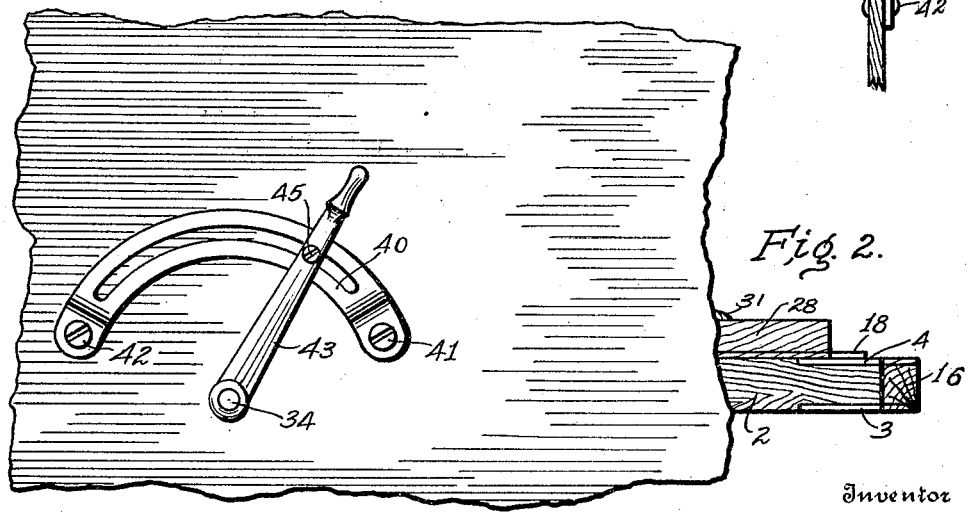

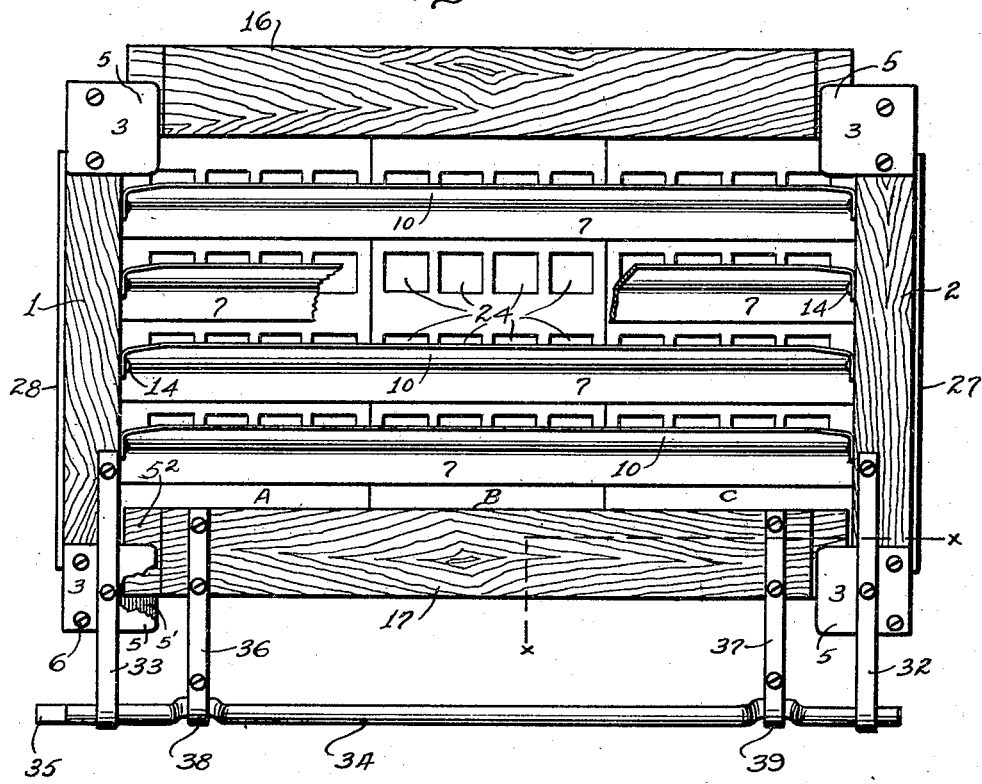
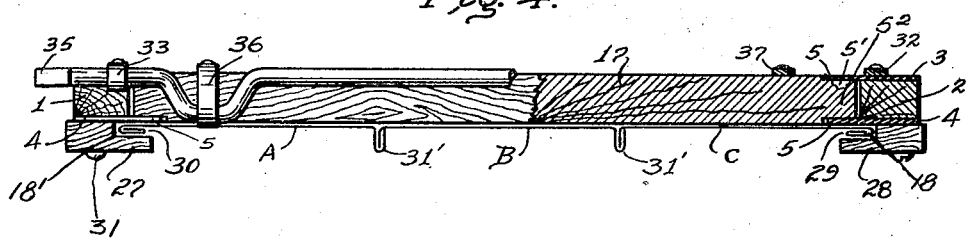

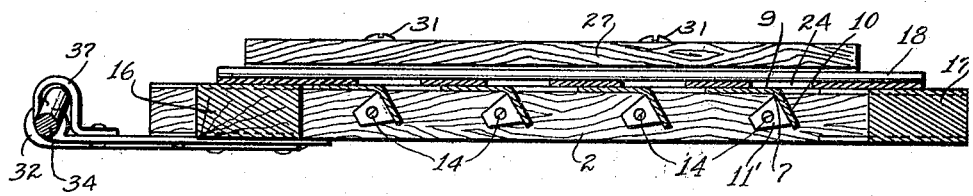
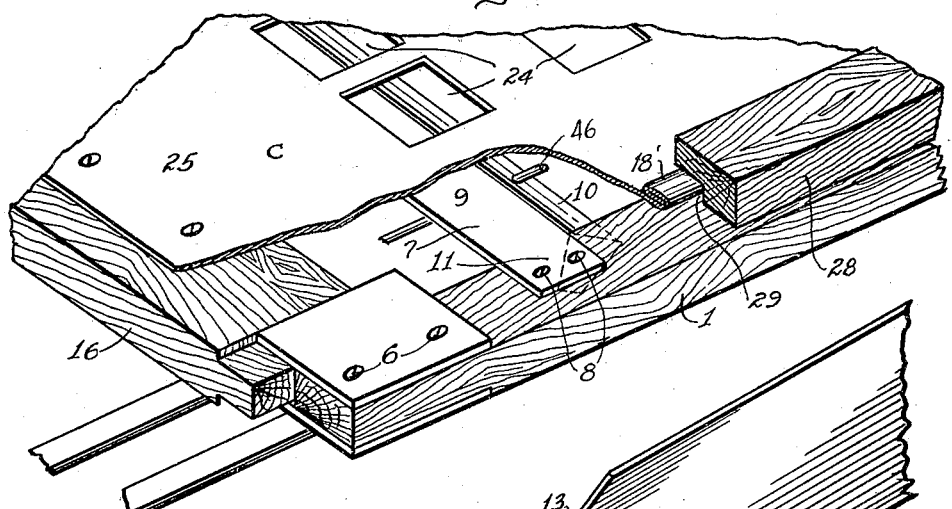
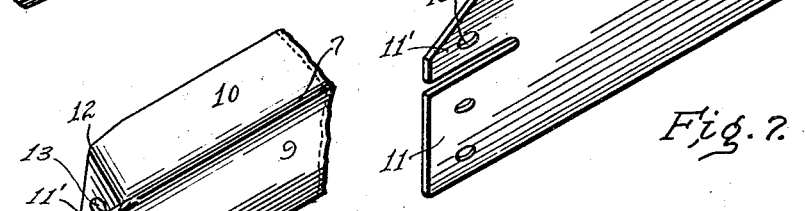
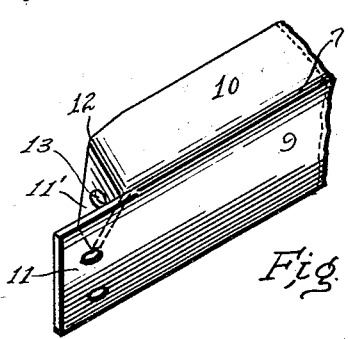

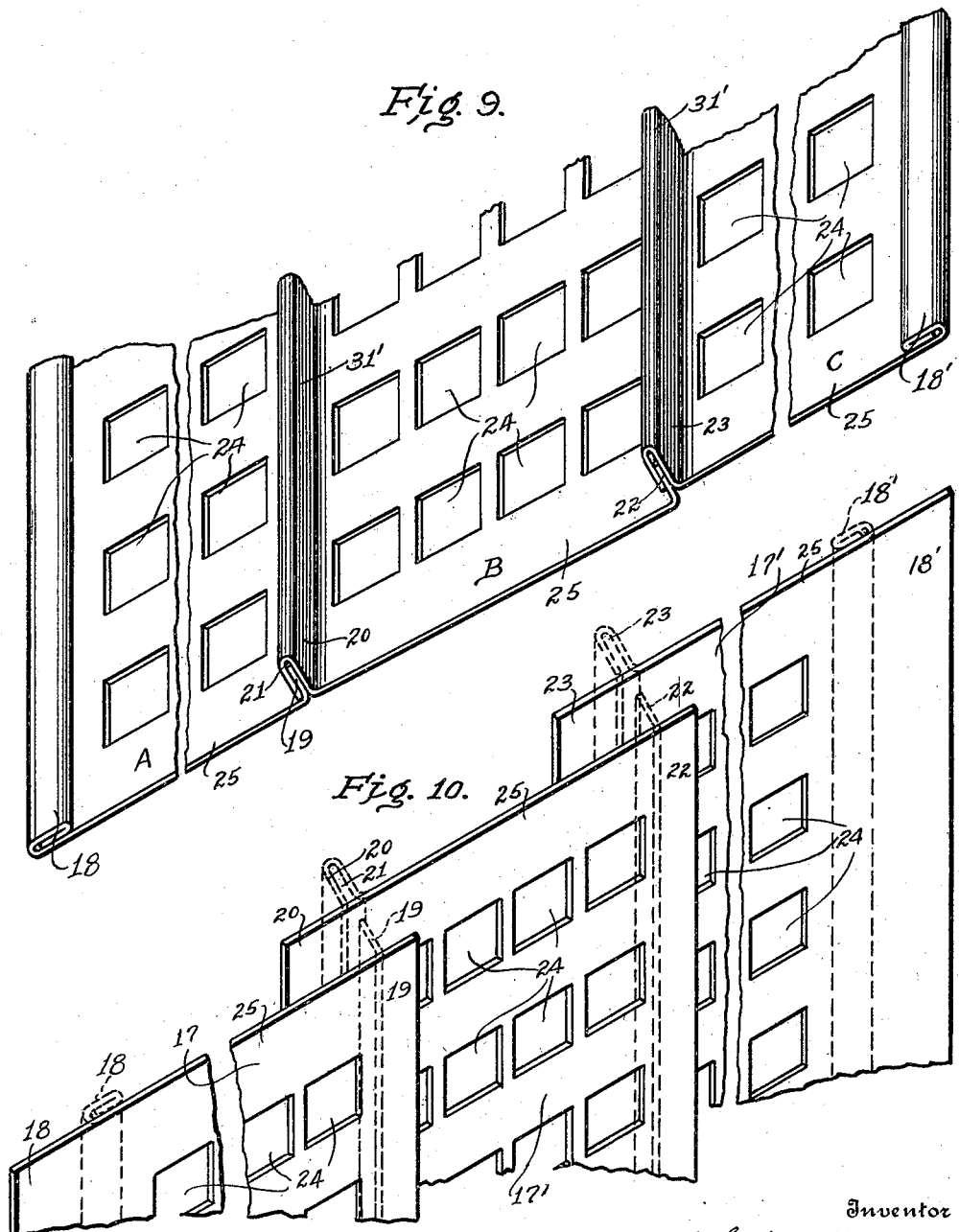

DANIEL EMRY HOFFMAN, OF PLYMOUTH, OHIO.

SIEVE FOR THRESHING-MACHINES.

1,327,325.

Specification of Letters Patent.   Patented Jan. 6, 1920.

Application filed October 22, 1918. Serial No. 259,176.

*To all whom it may concern:*

Be it known that I, DANIEL EMRY HOFFMAN, a citizen of the United States of America, residing at Plymouth, in the county of Richland and State of Ohio, have invented certain new and useful Improvements in Sieves for Threshing-Machines, of which the following is a specification.

This invention relates to adjustable sieves for threshing machines or the like in which grain is cleaned by an air blast separating the straw, stems, chaff and the like therefrom.

One of the objects of the invention is to provide a plurality of smooth and unobstructed channels or paths on a meshed element and confining the travel of the grain, chaff, straw and the like to said channels formed of predetermined widths through the medium of a series of corrugations or flanges which are provided thereon.

Another object consists in the method of making the meshed element in sections so as to facilitate, expedite and eliminate the expense of making dies of more or less complication which is incidental to making and forming corrugations or flanges on an integral meshed element.

A further object is to provide means of confining and directing the travel of the grain, straw, stems, chaff and the like within the corrugations forming the channels, and which also brace, strengthen and impart rigidity to the meshed element when constructed either of one integral sheet metal blank or built up of a plurality of metal sections.

A further object is to provide wind guides that coöperate with the meshed element to afford facilities and means to deflect the air blast in such a manner and direction as to thoroughly clean the grain and separate it from the chaff, stems and the like, the wind guides being so arranged and formed as to present the same angular relation to the air blast at all points of the adjustment of the meshed element. The wind guides are constructed so as to connect to and brace the stationary frame-work of the sieve and form the elements comprising the slatted bottom of the sieve.

An important feature of this invention consists in arranging and constructing a sieve for threshing machines that retains all of the advantages of the well known non-adjustable lip sieves and at the same time provides a means of adjusting or varying the sieve mesh so as to adapt it for cleaning a variety of kinds and sizes of grain.

A further object is to construct a sieve with means of providing perfect alinement and contact between the top surface of the wind guides and the meshed element during the sliding and adjusting movement of the meshed element over the slatted surface which forms the top of the stationary wind guides.

Other objects of the invention are to provide means of slidably mounting and connecting the wind guides and meshed sieve element together and to provide means for imparting a sliding horizontal movement in a direct line to the meshed sieve element to vary the size of the openings or mesh of the sieve element by adjusting same in relation to the wind guides.

The invention illustrated in the accompanying drawing, described in the specifications and pointed out in the appended claims, is adapted to perform the functions hereinafter described and attain the objects described and others incident thereto.

Referring to the drawings:

Figure 1 is a top plan view of the sieve showing it assembled with the mesh partially open.

Fig. 2 is a side elevation of the sieve locking mechanism showing its application to the frame work of a separator.

Fig. 3 is a bottom plan view of the assembled sieve showing the mesh partially open.

Fig. 4 is a section of the sieve on the line x—x of Fig. 3.

Fig. 5 is a section of the sieve taken on the line o o of Fig. 1.

Fig. 6 is a fragmentary perspective view of the sieve with parts broken away to more clearly show the mounting and means for connecting the meshed sieve element and the wind guides and their frame-work.

Fig. 7 shows the form of the ends of the wind guides just prior to pressing the ends into shape to provide means of fastening the wind guides to the side bars.

Fig. 8 shows the completed form of the wind guides used after the second operation is performed pressing the ends into shape preparatory to fastening same to the side bars.

Fig. 9 shows in a conventional manner the meshed sieve blanks assembled together preparatory to fastening same to end bars.

Fig. 10 shows the method of forming the combined corrugated flanges and connecting means in series preparatory to fastening same together.

In the drawings, reference numerals 1 and 2 represent side bars constituting part of the stationary frame work of the sieve. The lower and upper surface of each corner of the side bars are cut away or depressed to receive corner plates 3 and 4 so as to position the plates on a plane or flush with the upper and lower surfaces of the side bars. The plates are preferably made of sheet metal. The plates project beyond, (as shown at 5—5) the inner edges of the side bars to a predetermined extent to provide groove or channel bearings 5' for the movable frame-work of the sieve which will be described hereinafter. The plates are fastened to the corners of the side bars by any well known fastening means, i. e. by screws 6, as shown in the drawings.

A series of wind guides 7 are arranged in interspersed relation to each other and fastened to the side bars by screws 8 or the like, as shown. The wind guides are formed with smooth upper surfaces 9 and angularly related air blast deflecting smooth flange portions 10 which are preferably inclined at an angle of 45 degrees in the direction of the separator fan (not shown).

In order to provide a convenient and efficient means for attaching the wind guides to the side bars, the guides are formed at each end so as to leave the free ends of the smooth upper portion extending over, in alinement, and in contact with the upper surfaces of the side bars as shown at 11. The ends 11' of the flange portions 10 are cut away from the smooth portions 9 of the wind guides and bent at 12 in right angular relation to the body portion of the smooth upper surfaces and surfaces of the flanges and apertured at 13 to receive screws 14, nails or the like to provide means of fastening the wind guides to the side bars. The length of the wind guides is governed by the size of the sieve it is desired to construct.

It will be noted that the wind guides are fastened to the side bars at two points at both ends to wit: the top surfaces of the side bars as shown by the screws 8 and at the inner edges of the side bars by the screws 14 which pass through the apertured angular portions of the flanges, (as shown at 13) thereby providing a series of combined wind guides and braces in one unit.

In constructing the coöperative, movable meshed element of the sieve and its framework, end bars 16 and 17 are provided and preferably cut away at their ends to fit within and slidably engage the channel bearings 5' formed by the corner plates 3 and 4 hereinbefore described. The purpose of cutting away the upper and lower surfaces of the end bars is to provide a smooth and unobstructed top surface on the stationary element of the sieve.

The meshed or movable element of the sieve is preferably constructed in sections. The method or means of constructing the movable meshed element of the sieve constitutes an important feature of the invention, although it will be obvious to those skilled in the art that dies can be made to make the meshed element of the sieve or in other words in one piece. The preferable method or construction of the meshed movable element of the sieve is to build same in sections which will now be described.

The desired number of blanks of sheet metal to construct a predetermined size sieve are first blanked out to form a plate substantially of rectangular form, as shown at 17'. One end of the blank is folded and then double folded upon itself to provide a strengthening rib 18, along the edge of each of the outside meshed strips. The opposite edge, or end of the blank is then turned at right angles to the body portion of the strip as shown at 19.

The above described operations complete the first or one outside portion (A) of the movable meshed element. Another blank (B) is then folded upon itself as shown at 20 and then turned at right angles to the body portion of the blank, leaving an intervening space 21 between the fold to receive and engage the right angular portion 19 of the preceding blank (A), thereby securely connecting the blanks together. Prior to connecting the blanks, the end 22 of blank B is turned at right angles to the body of the blank, as shown in the drawings. As many intervening blanks as desired to complete the size of sieve wanted or ordered can be made in the same manner by repeating the operation hereinbefore described. Only one conventional intervening blank is shown. It is apparent, however, that a plurality of intervening blanks can be used without departing from the spirit of the invention.

To complete the sieve, a blank C is provided, for the opposite outside edge forming the body of the movable meshed element, one edge 23 thereof is folded upon itself and turned at right angles to the body portion leaving an intervening space to receive and engage the right-angled portion 22 of the blank B, its opposite edge is then double folded in the same manner and for the same purpose as described with reference to blank A.

The blanks A, B, and C are apertured as shown at 24, with apertures preferably rectangular in form. A predetermined portion of the ends 25 and 26 of the connected blanks however are not apertured so as to provide an extra plane surface and means for securely fastening the blanks by screws or the like to the end bars.

In assembling the movable and stationary elements for coöperative operation the ends $5^2$ of the end bars as described slidably engage the channel or grooves 5' formed by the ends 5 of the corner plates. The outer edges of the blanks A and C thereby engage between the ends of the upper corner plates and the grooves 29 and 30 formed in the cleats leaving the ribbed edges 18 and 18' of the outside plates A and C intervened between the outer ends of the upper corner plates and in the grooves 29 and 30 formed in the cleats thereby guiding the meshed element in its sliding adjustable movement over the top surfaces of the wind guides.

To further guide and maintain the meshed element in perfect contact and alinement with the upper surfaces of the wind guides, cleats 27 and 28 are provided and grooved at 29 and 30 to fit over and in contact with the ribs 18 and 18' of the outside blanks of the meshed element. The cleats are fastened to the side bars by the screws 31 or in any other well known manner. Attention is called to the fact that the connecting means of the sections also provide a series of ribs or corrugations 31' upon the meshed element which greatly strengthens the meshed element and further provides a series of channels of predetermined widths so as to guide and confine the grain, straw, chaff, stems and the like in their travel over the meshed element along well defined paths which are of great assistance in thoroughly performing the function of cleaning the grain.

To adjust the meshed element for cleaning different sizes of grain or the like, I have shown a conventional type of adjustment for moving the meshed element over the surfaces of the wind guides to vary more or less the meshes of the movable sieve element which will now be described. Bracket bearings 32 and 33 are fastened to the side bars and project beyond the end of said bars. A crank shaft 34 is journaled in the bearings, preferably having one or both ends, projecting beyond the bearings. One end is preferably squared as shown at 35 to receive a wrench or the like to manipulate or rotate the crank shaft. Pitmen 36 and 37 are rigidly fastened to the end bars of the movable sieve element and connected to the cranks of the crank shaft through the medium of the elongated eye bearings 38 and 39. More cranks can be added to the crank shaft if desired.

Operation is as follows:

When the crank shaft is rotated, it imparts a sliding movement to the meshed element of the sieve through the medium of the pitmen 36 and 37 and as the meshed element moves over the top surface of the used guides, the meshes of the sieve are closed more or less, according to the direction the meshed element is forced to travel in by the manipulation of the crank shaft, thereby providing means for closing the meshes of the sieve more or less, according to the kind or size of grain or the like it is desired to clean.

To positively lock the meshed element at any point of its adjustment with relation to the wind guides a slotted offset segment 40 is fastened to the side frame-work of the separator by the screws 41 and 42. An operating lever 43 is securely fastened to the extension 44 of the crank shaft and it is arranged to extend or project across and beyond the segment 40 as shown in Fig. 2. When the lever is manipulated the crank shaft 34 is rotated thereby adjusting the meshes of the sieve. The operating handle 43 is held positively at any point of its adjustment by a clamping bolt 45.

It will be noted that the upper surface of the wind guides correspond in width to the imperforate portions of the meshed element so that full and complete opening of the meshed element can be obtained and full closure of the mesh can also be obtained or any intermediate adjustment or closure of the mesh can be obtained to correspond with the size or kind of grain it is desired to clean.

Attention is further called to the fact that in the construction and method of making the sieve, no solder is used or needed which results in a great saving of labor and expense of material. It will also be apparent that the meshed element and the stationary wind guides will be maintained in close frictional contact with each other throughout their entire sliding surface as the construction thereof provides a rigid, non-buckling and non-bending element. If desired, an auxiliary brace 46 can be secured to the flanges of the wind guides by forming slots in alinement with each other and inserting the brace in the slots.

It will be further observed that in constructing a sieve as described, that the flanges of the wind guides remain constant at all times and at all adjustments for cleaning different sizes or kinds of grain and that the angle of inclination of the flanges toward the air blast never changes, thereby taking full advantage of the air blast in the cleaning process at all adjustments and at the same time maintaining uniform adjustment of the closure of the meshes of the sieve and maintaining the inclination of the angular frame member of the wind guides constant.

I claim:

1. In a combined wind guide and brace which is adapted to form a part of a top for threshing machine sieves composed of sheet metal formed to provide a plane smooth top surface and a parallel angularly related flange portion, the ends of the wind guides being provided with an angularly related bent portion with respect to the flange portion of the wind guide.

2. In combination, a frame, combined wind guides and braces for threshing machine sieves, composed of sheet metal formed to provide plane smooth surfaces and parallel angularly related flange portions forming wind guides, said wind guides also having kerfs formed in their ends and a portion of the ends turned at an angle to the flange portions, thereby providing means of attaching the wind guides to the top and side surfaces of the bars of the frame.

3. In a sieve for threshing machines, a series of independent wind guides arranged in intersticed relation and fastened to side bars, in combination with a meshed element, means to mount the meshed element upon and in close contact with the wind guides for sliding movement, and means to impart a sliding movement to the meshed element to force it to slide over the wind guides, which movement closes or opens more or less of the meshes of the sieve, as described.

4. In a sieve for threshing machines, a series of sections each formed with a plurality of screening apertures, the edges of the sections being formed with complementary relatively low upstanding fastening means for thereby securing such sections together to provide a plane surface divided by such fastening means into channels for the grain, in combination with means on the opposite side of the screen from the fastening means to adjust the size of the screening apertures.

5. In a sieve for threshing machines, a screen member formed with a plurality of screening apertures, said screen having a series of longitudinally arranged upstanding reinforcing ribs defining grain channels, the ribs being comparatively low and formed by interlocked portions of otherwise independent sections of such screen member, and means coöperating with the surface of the screen member opposite to the ribs for adjusting the size of such screening apertures.

6. In an adjustable sieve for threshing machines, a plane meshed element provided with a series of upstanding corrugations adapted to strengthen the same and direct the course of travel of the grain in fixed channels, a frame, independent wind guides separately attached to the frame and formed with continuous angularly related surfaces to provide a plane top surface and a wind deflector; said wind guides being also provided with means at their ends for attachment to the upper surface and sides of the frame.

7. In an adjustable sieve for threshing machines a plane meshed element provided with a series of corrugations to strengthen the same and to direct the course of travel of the grain in fixed channels, a frame, independent wind guides formed with angularly related continuous surfaces to provide a plane top surface and wind deflectors said wind guides being also provided with integral means at their ends for attaching to the surface and sides of the frame, and means to impart sliding movement to the meshed element.

8. A sieve for threshing machines comprising a plane meshed element formed of a series of separate parts which are attached together to form a series of corrugations, a frame, a series of independent wind guides arranged in intersticed relation on the frame and provided with attaching means adapted to fasten the guides to the top and sides of the frame.

9. A sieve for threshing machines comprising a plane meshed element formed of a series of separate parts attached together to form a series of corrugations, a frame, a series of independent wind guides arranged and fastened in intersticed relation on the frame, said wind guides being provided with attaching means which are adapted to fasten the guides to the top and sides of the frame, and means to impart a sliding movement to the meshed element.

10. In a sieve for threshing machines, in combination a frame, a series of connected sieve members formed to provide a sieve top, a series of independent wind guides which are arranged and fastened to the frame in intersticed relation to each other, said elements being connected together and slidably associated to provide an adjustable sieve mechanism.

11. In a sieve for threshing machines, in combination a frame, a series of sieve members formed to provide a sieve top, combined independent wind guides and braces arranged in intersticed relation and fastened to the frame, said series of sieve members being connected together and slidably mounted upon the wind guides to provide a means of covering up more or less of the openings between the wind guides, and means to impart a sliding movement to the connected sieve members in unison.

12. In a sieve for threshing machines, in combination with a frame, a series of independent combined wind guides and braces having means formed on their ends to attach to the top and sides of said frame, a meshed element formed with a series of corrugations on its top surface which is movably mounted on the wind guides to variably cover the spaces between the wind guides.

13. In a sieve for threshing machines, in combination with a frame, a series of independent combined wind guides and braces having means formed on their ends to attach same to said frame, a meshed element formed with a series of corrugations on its top surface and movably mounted on the wind guides to variably cover the spaces between the wind guides, and means to impart a sliding movement to the meshed element.

14. In a sieve for threshing machines, in combination with a frame, a series of independent wind guides formed to provide combined and continuous surface air deflectors and braces with integral means of attaching same to the frame in intersticed relation to each other, and a series of meshed elements connected together to form a sieve top which is slidably mounted upon the wind guides to open or close the spaces more or less between the wind guides.

15. In a sieve for threshing machines, in combination with a frame, a series of independent wind guides formed to provide combined continuous surface air deflectors and braces with integral means of attaching same to the frame in intersticed relation to each other, a series of meshed elements connected together to form a sieve top which is slidingly mounted upon the wind guides to open or close the spaces more or less between the wind guides, and means to impart a sliding movement to the meshed elements in unison.

16. In a sieve for threshing machines, a frame, a series of independent wind guides attached to the frame in spaced relation to each other, a series of meshed blanks having imperforate end portions connected together and to the frame to form a series of channels, means of slidingly mounting the meshed elements upon the independent wind guides to permit the meshed element to move over the stationary wind guides to cover more or less of the spaces between the wind guides.

17. In a sieve for threshing machines, a frame, a series of independent wind guides attached to the frame in spaced relation to each other, a series of meshed blanks having imperforate end portions connected together and to the frame to form a series of channels, means of slidingly mounting the meshed elements upon the independent wind guides to permit the meshed element to move over the independent wind guides to cover more or less of the spaces between the wind guides, and means to impart a sliding movement to the meshed element in unison.

18. In a sieve for threshing machines, a frame comprising side and end bars, a series of independent wind guides fastened to the side bars of the frame in intersticed relation to each other, in combination with a series of connected meshed sections which form channels and which are attached to the end bars and adapted to move over the wind guides in unison to cover the spaces between the wind guides.

19. In a sieve for threshing machines, a frame comprising side and end bars, a series of independent wind guides fastened to the side bars in intersticed relation to each other, in combination with a series of connected meshed sections provided with corrugations and which are attached to the end bars of the frame and adapted to move over the independent wind guides to cover more or less of the spaces between the wind guides, and means to impart a sliding movement to the connected meshed elements in unison.

20. In a sieve for threshing machines, comprising side and end bars, a series of independent combined braces and wind guides secured to the side bars in spaced relation to each other, in combination with a series of connected meshed elements which are mounted on the wind guides to move over and in close contact with the wind guides and variably cover the space between the wind guides.

21. In a sieve for threshing machines, comprising side and end bars, a series of independent combined braces and wind guides which are secured to the side bars in spaced relation to each other, in combination with a series of connected meshed elements which are mounted on the wind guides to move over and in close contact with the wind guides, and means to impart movement in unison to the series of connected meshed elements.

22. A sieve for threshing machines, comprising a screen member made up of sections formed with complementary interfitting portions to provide upstanding ribs on such member to reinforce such member and define grain channels, and members underlying the screen member in contact with the surface opposite that having the ribs to assist the reinforcing effect of such ribs in supporting the screen member against sagging, said screen member and underlying members being relatively movable to adjust the screening effect of such screen member.

23. In a sieve for threshing machines, in combination with a frame, a series of independent combined wind guides and braces having their ends formed to provide two points of attachment to the frame and fastened to the frame in spaced relation, and a series of meshed elements connected together and adapted to be moved over the wind guides in unison to variably cover the spaces between the wind guides.

24. In a sieve for threshing machines, in combination with a frame, a series of independent wind guides and braces having their ends formed to provide two points of attachment to the frame and fastened to the frame in spaced relation, a series of meshed elements connected together and adapted to be moved over the wind guides in unison to variably cover the space between the wind guides, and means of imparting movement to the connected meshed elements in unison as described.

In testimony whereof I affix my signature.

DANIEL EMRY HOFFMAN.